United States Patent [19]

Quella et al.

[11] Patent Number: 4,689,250
[45] Date of Patent: Aug. 25, 1987

[54] CROSS-LINKED POLYMER COATED METAL PARTICLE FILLER COMPOSITIONS

[75] Inventors: Ferdinand Quella, Neubiberg; Ulrich Leute, Zorneding, both of Fed. Rep. of Germany

[73] Assignee: Siemens Aktiengesellschaft, Berlin and Munich, Fed. Rep. of Germany

[21] Appl. No.: 795,317

[22] Filed: Nov. 6, 1985

[30] Foreign Application Priority Data

Nov. 16, 1984 [DE] Fed. Rep. of Germany ....... 3442031

[51] Int. Cl.$^4$ ........................... B05D 7/00; B32B 5/16; B32B 9/00; H01B 1/02
[52] U.S. Cl. .................................. 427/216; 252/513; 252/512; 427/221; 428/407
[58] Field of Search ................ 427/216, 221; 428/407; 252/512, 513, 514

[56] References Cited

U.S. PATENT DOCUMENTS 4,371,459 2/1983 Nazarenko ..................... 252/513 X
4,415,630 11/1983 Kubota et al. .................. 427/216 X
4,548,879 10/1985 St. John et al. ................ 427/261 X Primary Examiner—Michael R. Lusignan
Attorney, Agent, or Firm—Hill, Van Santen, Steadman & Simpson

[57] ABSTRACT

A filler composition composed of metal particles present in the tightest possible packing which are individually coated with a cross-linked polymer layer is provided which has high thermal conductivity and high electrical insulation capacity. Such filler composition is usefull as an addition to resins employed in injection molding and extrusion. A high resistance to abrasion is achieved by the cross-linked coating layers (22,24). A filing degree of about 90 Vol. % is achievable with such a filler composition, and such displays a breakdown voltage greater than about 100 V.

11 Claims, 3 Drawing Figures

CROSS-LINKED POLYMER COATED METAL PARTICLE FILLER COMPOSITIONS

BACKGROUND OF THE INVENTION

1. Field of the Invention

The invention lies in the field of metal powder filled cross-linkable with plastic compositions adapted for processing by injection molding or extruding and further adapted for use under conditions involving high thermal conductivity and high electrical insulating capacity.

2. Prior Art

Heat-dissipating plastics which are also non-electrically conductive must comprise a cladding which is difficult to produce using conventional processing conditions, such as extruding or injection molding. The high shear forces occuring in such a processing can only be avoided by a cross-linking cladding composition.

A metal powder filled thermoplastic is known, for example, from the German patent application No. 34 21 105.5 (corresponding to U.S. Ser. No. 741,351 filed June 5, 1985). Here, polyolefins are synthesized in the presence of light metal powder or nonferrous metal powder by means of Ziegler catalyst and such are cross-linked at least in proximity of the metal particles. The plastic composition produced in this manner is employed either by itself or as an alloy (polyblend) with other polymers for heat elimination with simultaneous electrical insulation in electronic or electrical engineering applications. The thermoplastic composition disclosed here, which can also be employed as a "filler" for casting resins, presents difficulties when it is to be subsequently worked into a thermoplastic in comminuted form (employment temperature 140° C.) Further, only a few olefins, such as, for example, ethylene can be polymerized with Ziegler catalysts to the poorly heat-stable polyethylene. In addition, the Ziegler method can only be implemented in special reactors upon exclusion of air and humidity. A simple mixing of metal grains (powders) into casting resins and a subsequent comminution of the polymerized resins likewise does not lead to suitable fillers for injection moldable thermoplastics because the insulating casing layer around individual metal particles becomes irregular during comminution, and, thus, no particularly tight packing can be achieved, or, alternatively, the insulating casing layer chips off and the filled thermoplastics do not achieve the required values of electrical insulation. Metal grains directly worked into casing resins or the like likewise only lead to thermal conductivities of about 1.5 W/mK.

BRIEF SUMMARY OF THE INVENTION

More particularly, the present invention relates to filler compositions comprising metal powders (or grains) which have been individually coated with an adherent layer of a crosslinked resin. Such filler compositions are adapted for blending with polymers (resins) suitable for injection molding, extruding, or the like to produce uniform resin (plastic) compositions having excellent moldability, thermal conductivity, and electrical resistance characteristics.

A principal object underlying the present invention is to provide a filler composition for injection moldable of extrudable plastic compositions which has the following characteristics in combination:

1. A relatively high thermal conductivity (preferably in the range from about 2 to 10 W/mK,
2. Electrical insulation given breakdown voltages preferably greater than about 100 V,
3. Relatively high resistance to abrasion before being worked into such a plastic composition, and
4. Capacity to achieve a relatively high filling level preferably in the range from about 50 to 90 volume percent.

These characteristics are achieved by a filler composition of the present invention wherein the metal grains are provided on all sides with a plastic casing (coating) produced by cross-linking The packing density denpends on particle size distribution and filling level.

It lies within the scope of the present invention to select a diameter for the individual metal grains in the range from about 5 through 100 $\mu$m and to employ metal grains which are preferably composed of iron, copper, cobalt, vanadium, nickel, silver, aluminum, or alloys thereof which are preferably provided with an oxide layer several molecule layers thick on individual grains (as usually appears during storage of such metal powders under air).

In a development of the present invention, a plastic layer enveloping the individual metal grains has a thickness up to a maximum of about 5 $\mu$m and is comprised of one of the following plastics: an unsaturated polyester resin, an epoxy resin, a polyphenylene sulfide, and polymers produced by using free radical polymerizing monomers in the presence of cross-linking agents. Typically the plastic layer thickness is in the range of 0,1 . . . 5 $\mu$m. The degree of cross-linking is defined by the ratio of monomers to cross-linking agent, e.g. styrene and divinylbenzene, and the copolyuerization; ratios and the degree of conversion (typically between 50% . . . 100%)

Other and further objects, purposes, advantages, aims, utilities, features and the like will be apparent to those skilled in the art from a reading of the present specification taken together with the drawings.

BRIEF DESCRIPTION OF THE DRAWINGS

In the drawings:

Referring to FIG. 1, an embodiment of the present invention is illustrated wherein an aluminum grain 1 which is provided with a surface oxide layer 2 is coated with about a 5 $\mu$m thick polymer layer 2 which is derived by polymerization of a monomer mixture consisting of styrene and divinylbenzene with the initiator benzoyl peroxide. The oxide coated metal grains 1, 2 are provided initially with a mono-molecular hydrophobic layer 4 comprised of, for example, vinyl silane. The layer 3 is achieved by dispersing the grains 1,2,4 in water (H$_2$O) under rapid agitation in the presence of about 1% by weight based on total water of an emulsifier, for example, a cationic surfactant such as sodium laurylsulfate, a nonionic surfactant, such as "Arcopal N 100" (=nonylphenolpolycoletuer a trademark of the Hoechst Company), and an anionic surfactant such as cetyl ammonium chloride. Subsequently, from about 0.1 through 5% by weight based on total water of a free radical polymerizable monomer, for example, styrene, vinylacetate, acrylonitrile, mixtures thereof, or the like, together with from about 1% to 20% by weight (based on total polymerizable monomer composition) of a cross-linking monomer, for example, di-vinylbenzene, tri-allyl cyanurate, mixtures thereof, or the like is added. The polymerization is then initiated by heating the system to about 60° C., and adding an initiator, for example, azobisisobutyronitrile or benzoyl peroxide, which decomposes at this temperature. The concentration of initiator can range from about 1 through 3% by weight based on total composition. Alternatively, at room temperature, a redox system, for example, sodium dithionite and potassium peroxide disulfate, can also be employed. The symbols identified by the reference numeral 5 in FIG. 1 represent the hydrophilic end of the surfactant molecules.

Referring to FIG. 2, an embodiment of the invention is illustrated wherein an iron grain 11 which is provided with a surface oxide layer 12 composed of $Fe_2O_3$ is suspended with agitation in a high-boiling solvent or carrier liquid. Such a grain has a size in the range from about 5 to 50 μm. Such carrier liquid is a solvent for low-molecular weight polyphenylenesulfide (PPS), such as a VI powder available from the Philips Petroleum Company About 1-2 weight percent of such a polymer is soluble in benzyl benzoate at 150° C. (on a 100 weight percent total solution basis). At temperatures of about 150° C., the polymer is not appreciably modified.

Figure 1:
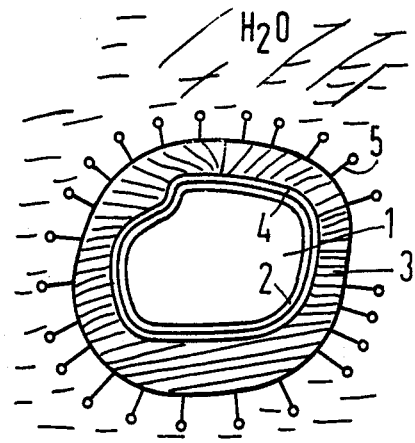
FIG. 1 diagrammatically illustrates the mechanism employed when enveloping a metal grain composed, for example, of aluminum, with a polymer derived from a monomer, composition composed of, for example, styrene, divinylbenzene, and benzoyl peroxide (as initiator) under emulsion polymerization conditions.
Figure 2:
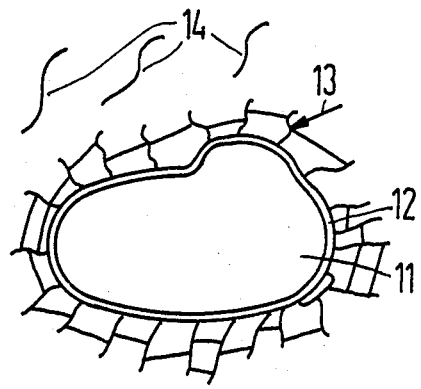
FIG. 2 diagrammatically illustrates the accelerated cross-linking of, for example, a coating of polyphenylenesulfide in benzyl benzoate about an iron grain.

A suitable suspension is produced for example by dispersing about 10 grams of the oxidized iron powder 11, 12 in about 100 ml benzyl benzoate with rapid agitation. Other suitable solvents include, for example, diphenylenether, chloronapthalene, or the like. Two grams of polyphenylenesulfide (PPS-VI) are then added to the suspension and the suspension is then heated at about 280° C. for up to eight hours. The result is that the polymer forms a cross-linked layer around the oxidized iron powder 11, 12. The cross-linking in the solution is slower by orders of magnitude, so that no insoluble particles arise outside of the iron grains. The arrow 13 indicates the absorbed polyphenylenesulfide with the cross-linking locations. The symbols identified with the reference numeral 14 are intended to represent the dissolved polyphenylenesulfide molecules in benzyl benzoate.

The small iron spheres 11, 12 which are thus encapsulated with the polymer layer of coating 13 are filtered off and separated from residual dissolved PPS and solvent. Residual solvent is conveniently eliminated by brief suspension of the coated iron spheres in methanol or other low boiling miscible solvent for the high boiling solvent.

When small spheres to be clad with polyphenylenesulfide are composed of other metals, then such are conveniently treated in the most porous form available with $Fe_2O_3$ powder by drumming or by addition during a grinding operation and then are processed in the same fashion as described above.

Figure 3:
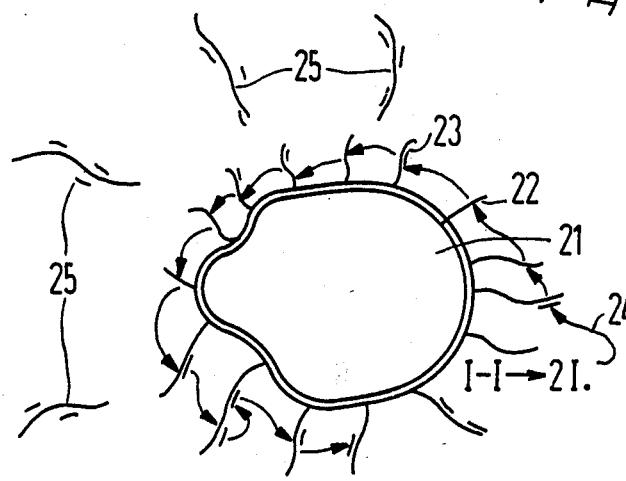
FIG. 3 diagrammatically illustrates the accelerated cross-linking of, for example, unsaturated polyester resins by decomposition of a corresponding peroxide at the surface of a metal grain composed, for example, of cobalt under suspension polymerization conditions.

Referring to FIG. 3, an embodiment of the invention is illustrated wherein, for example, FIG. 3: 10 grams of metal grains 21 comprised of cobalt and provided with an oxide layer 22 are suspended in 100 ml of a dimethyl formamide solution of an unsaturated polyester resin, for example, about 0.5% "Palatal P4" (a trademark of BASF for an unsatured polyester resin) at ambient temperature with rapid agitation. 10 ml of a 5% solution of benzoyl peroxide in phthalic acid ester are added dropwise thereto. After another two hours of continuous agitation, the temperature is slowly raised to 80° C. in order to allow the compound to react out. The symbols provided with the reference numeral 23 represent the adsorbed, unsaturated polyester resin, while the cross-linking initiator is symbolized with the arrows 24. The symbols identified with numeral 25 designate the dissolved unsaturated polyester polymer molecules having double bonds. I—I designates the initiator molecule, here, for example, benzoyl peroxide As may be particularly seen from FIG. 3, the polymerization begins very quickly in the boundary region between metal and solvent phase The result is that the individual metal grain 21, 22 is surrounded by a polymer film 23 (24) layer or coating.

The recovery of the clad or cross-linked polymer coated metal grains which can be immediately employed as filler is accomplished conveniently by precipitation in a carrier liquid like methanol wherein residual unsaturated polyester resin is substantially completely insoluble.

The manufacture of filler compositions in accord with the methods of the present invention result characteristically in products which have relatively high thermal conductivity (up to about 10 W/mK), have a high resistance to abrasion, are electrically insulative given breakdown voltages greater than about 100 V, and achieve filling levels up to about 90 Vol.%.

The polymerization of epoxy resins is accomplishable analogously to the method described above for unsaturated polyester resins. A complexing, preferably a chelate-forming, amine is added to the suspension of metal grains, for example, ethylene diamine in the case of oxide coated copper grains. The cross-linked polymer deposits upon the particle surfaces in the form of a complex. As a consequence thereof, the polymerization of the added epoxy resin ensues only at the metal surface, as desired. Depending upon the activity of the amine additive, the polymerization is executed in a time interval extending up to about 8 hours. During the progression of this interval, the temperature of the system is gradually raised up to about 120° C. the like is conveniently employed as the solvent or carrier liquid.

As is apparent from the foregoing specification, the invention is susceptible of being embodied with various alterations and modifications which may differ particularly from those that have been described in the preceeding specification and description. It should be understood that we wish to embody within the scope of the patent warranted hereon all such modifications as reasonably and properly come within the scope of our contribution to the art.

We claim:

1. A method of making a filler composition having high thermal conductivity and high electrical insulatiabiltiy for use in injection moldable or extrudable plastic formulations comprising the steps of:
   (a) dispersing metal particles either in a non-aqueous medium or in water containing an emulsifier, (b) adding to the resulting dispersion a composition to be cross-linked in a concentration of 0.1 through 5% by weight based upon total dispersion weight, and further adding any agents necessary to produce a cross-linked polymer, (c) executing a cross-linking polymerization about said so dispersed metal particles, and (d) separating the resulting cross-linked polymer coated metal particles in a medium which does not dissolve such coated polymer.

2. The method of claim 1, wherein said metal particles comprise aluminum particles having a surface oxide layer and wherein said composition to be cross-linked comprises radically-polymerizable monomers with cross-linking adjuvants, and:

(a) a mono-molecular, hydrophobic layer is applied to said aluminum particles in their surface oxidized condition by treatment thereof with, a chlorosilane in organic solvent;

(b) the resulting particles (1,2,4) are dispersed in water containing an emulsifier;

(c) a radically-polymerizable monomer selected from the group consisting of styrene, vinyl acetate, acrylonitrile and mixtures thereof, together with a cross-linking monomer selected from the group consisting of divinyl benzene triallyl cyanurate, and mixtures thereof are added to the said water, thereby to produce an emulsion;

(d) said emulsion is heated to about 60° C. and an initiator is added thereto which is selected from the group consisting of benzoyl peroxide, azobisisobutyronitrile and mixtures thereof, and (e) the resulting cross-link polymer coated aluminum grains are precipitated in water and separated off.

3. The method of claim 2, wherein a cationic surfactant, a nonionic surfactant, or an anionic surfactant is employed as said emulsifier.

4. The method of claim 2 wherein a redox system containing sodium dithionite/potassium peroxo-di-sulfate is employed in place of said initiator.

5. The method of claim 1, wherein said metal particles comprise surface oxidized iron particles and said composition to be cross-linked comprises a polyphenylenesulfide, and:

(a) the oxidized iron particles are suspended in a high-boiling organic liquid medium which is a solvent for low-molecular weight polyphenylenesulfide, and said iron particles are suspended therein with rapid agitation;

(b) said polyphenylenesulfide is then added to the resulting suspension;

(c) a cross-linking polymerization is executed at about 280° C. over a timespan extending up to about 8 hours, and (d) the resulting cross-linked polymer coated iron particles are separated from said liquid medium after settling.

6. The method of claim 5, wherein residual solvent is eliminated by brief suspension of said resulting cross-linked polymer coated iron particles in methanol.

7. The method of claim 5, wherein said liquid medium is selected from the group consisting of benzyl benzoate, diphenyl ether, and chloronaphthalene.

8. The method of claim 1, wherein said metal particles have their surfaces oxidized and wherein said composition to be cross-linked comprises unsaturated polyester resin, and:

(a) said oxidized metal particles are suspended with rapid agitation in dimethyl-formamide which contains dissolved therein said unsaturated polyester resin, (b) an accelerator is added in dissolved form into such suspension dropwise, and (c) a cross-linking polymerization is executed with constant agitation over a timespan of about 2 hours with slow heating up to about 80° C.

9. The method of claim 8, wherein said oxidized metal particles are comprised of a metal selected from the group consisting of cobalt, and copper, and said acceleration comprises a 5% by weight solution of benzoyl peroxide in phthalic acid.

10. The method of claim 1, wherein said metal particles have their surfaces oxidized and wherein said composition to be cross-linked comprises an epoxy resin, and:

(a) said oxidized metal particles are suspended in a high-boiling, non-aqueous carrier liquid;

(b) said epoxy resin and an accelerator which is preferably an amine complex with a metal ion, are added to such suspension; and (c) a cross-linking polymerization is executed within about 8 hours at a temperature ranging from about 80° C. to 120° C.

11. The method of claim 10, wherein said oxidized metal particles are composed of copper, and wherein said amine complex comprises a solution of ethylene diamine in xylol.

* * * * *